J. P. HYDE.
Stench-Traps.
No. 143,907.
Patented Oct. 21, 1873.
Figure I.
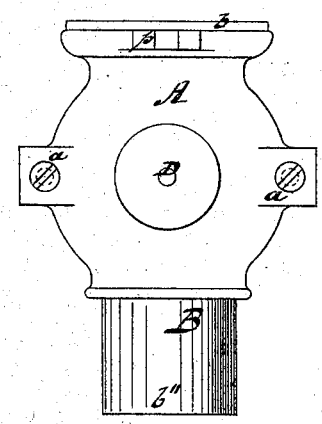
Figure II.
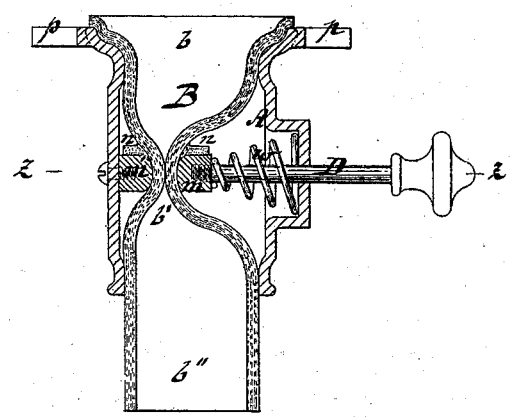
Figure III.
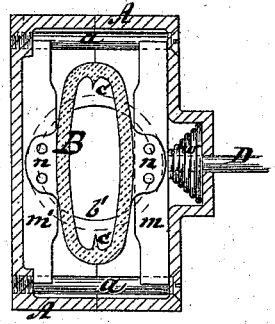
Figure IV.
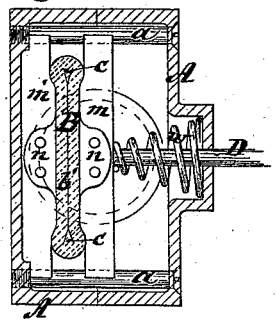
Witnesses
Inventor
James P. Hyde
per Henry E. Roeder
Attorney

UNITED STATES PATENT OFFICE.

JAMES P. HYDE, OF NEW YORK, N. Y.

IMPROVEMENT IN STENCH-TRAPS.

Specification forming part of Letters Patent No. 143,907, dated October 21, 1873; application filed March 5, 1873.

*To all whom it may concern:*

Be it known that I, JAMES P. HYDE, of New York, in the county and State of New York, have invented certain Improvements in Stench-Traps, of which the following is a specification:

This invention consists in the arrangement of a peculiar-shaped elastic pipe in a chamber, acted upon by a piston or follower, whereby said pipe is pressed together to prevent the escape of water, gas, or vapors, or whereby said pipe may be opened to allow the passage of water or other materials.

Figure I represents an outside view of a stench-trap embodying my invention. Fig. II is a cross-section of the same. Figs. III and IV are horizontal sections at the line $z\ z$, Fig. II, the one representing the trap open, and the other showing the same closed.

Similar letters represent similar parts in all the figures.

In the accompanying drawing, A represents a suitable metal chamber, made in two parts, and fastened together by means of screws or bolts $a\ a$, and provided on its top with a suitable flange, or with lugs $p\ p$, to fasten the same to the bottom of the sink, or any other chamber to be connected with the sewer. B is an india-rubber or flexible tube or pipe placed into this metal chamber A. The upper part $b$ of this pipe B is made cylindrical and bell-mouthed to fit a recess in the top of the chamber A, and at the same time to project a little above the same, to act as a joint between the same and the bottom of the sink or other chamber to which this chamber A is fastened. The lower part $b''$ of this pipe B is likewise made cylindrical, and fastened, by means of any suitable coupling, to the lead or other pipe passing into the sewer. The central part $b'$ of this elastic pipe B is made elliptical, with sharp internally-projecting tongues or pointed lips $c\ c$ in the corners, (see Figs. III and IV,) for the purpose of allowing the two flat sides of this elliptical part of the pipe to be pressed close together, and to form a perfectly tight joint in said corners when thus pressed together, without danger of breaking the pipe in those places.

On the outer sides of this elliptical part projections or lugs $n\ n$ are made, whereby this elliptical part of the pipe B is fastened to the follower $m$ and projecting part $m'$ situated in the chamber A. The projecting part $m'$ is securely fastened to the inside of the chamber A, and holds, therefore, the back of the elliptical part of the pipe B fast, while the follower $m$ is allowed to slide upon, and is guided by, the bolts $a\ a$, and is acted upon by a suitable spring, $w$, whereby this elliptical part of the pipe B is pressed tight together, as shown in Figs. II and IV, to prevent the escape of water, gas, or vapors in either direction. To the follower $m$, a rod, D, is fastened, passing through the front of the chamber A, whereby this follower $m$ can be moved backward, taking with it that side of the elliptical part of the pipe A attached to the same by means of its lug $n$, opening thereby this elliptical part, to allow the escape of any water or other material, as may be desired, as shown in Fig. III. For very large traps, such as required in water-closets, followers arranged and operated similar to the follower $m$ may be arranged on both sides of the pipe B, and to which said followers the pipe is then attached.

I do not claim, broadly, an india-rubber or elastic pipe in a chamber or cock, operated to compress or close the passage; but

What I claim as my invention, and desire to secure by Letters Patent, is—

1. The arrangement of an india-rubber or elastic pipe, B, in a suitable casing, when the upper and lower ends of said elastic pipe are circular, and the central part of said pipe is made oval or elliptical in its horizontal section, substantially in the manner and for the purpose set forth.

2. The arrangement of the projecting tongues or pointed lips $c\ c$ in the inside of the central part of the pipe B, substantially as and for the purpose hereinbefore set forth.

JAMES P. HYDE.

Witnesses:
 HENRY E. ROEDER,
 C. THORNTON.